(12) United States Patent
Clute (10) Patent No.: US 11,674,595 B2
(45) Date of Patent: Jun. 13, 2023

(54) SCRAPER RING FOR A PISTON

(71) Applicant: Caterpillar Inc., Peoria, IL (US)

(72) Inventor: Adam Joseph Clute, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 212 days.

(21) Appl. No.: 17/247,493

(22) Filed: Dec. 14, 2020

(65) Prior Publication Data

US 2022/0186833 A1 Jun. 16, 2022

(51) Int. Cl.
*F16J 9/14* (2006.01)
*F16J 9/20* (2006.01)
*F16J 9/26* (2006.01)

(52) U.S. Cl.
CPC .......... *F16J 9/206* (2013.01); *F16J 9/14* (2013.01); *F16J 9/26* (2013.01)

(58) Field of Classification Search
CPC .......... F16J 9/206; F16J 9/14; F16J 9/26
See application file for complete search history.

(56) References Cited

U.S. PATENT DOCUMENTS

| | | | | |
|---|---|---|---|---|
| 1,345,804 A | * | 7/1920 | Norman | F16J 9/14 277/497 |
| 1,365,348 A | * | 1/1921 | Shetler | F16J 9/203 277/465 |
| 1,512,393 A | * | 10/1924 | Behnke | F16J 9/14 277/499 |
| 1,532,547 A | * | 4/1925 | Pruyn | F16J 9/14 277/499 |
| 1,833,887 A | * | 12/1931 | Andrews | F16J 9/14 277/497 |
| 2,112,103 A | * | 3/1938 | Kottusch | F16J 9/203 277/924 |
| 4,189,161 A | * | 2/1980 | Grimm | F16J 9/14 277/496 |
| 4,848,212 A | * | 7/1989 | Kawano | F16J 9/14 92/158 |

(Continued)

FOREIGN PATENT DOCUMENTS

| CN | 101929545 A | 12/2010 |
|---|---|---|
| CN | 105020047 B | 1/2018 |

(Continued)

OTHER PUBLICATIONS

International Search Report for Int'l. Patent Appln. No. 21209155.7-1015, dated Apr. 26, 2022 (9 pgs).

*Primary Examiner* — Vishal A Patel
(74) *Attorney, Agent, or Firm* — Brannon Sowers & Cracraft PC (57) ABSTRACT

A scraper ring for a piston includes a top surface, a bottom surface, an inner surface, and an outer surface. The top surface has a first planar portion and a first angled portion. The bottom surface has a second planar portion and a second angled portion. The second angled portion is configured to slidably contact the first angled portion to adjust a diameter of the scraper ring. The inner surface connects the top surface to the bottom surface. The outer surface is opposite to the top surface and is configured to form 360 degrees of contact with a wall of a cylinder to substantially limit an amount of oil entering a combustion chamber of the cylinder.

12 Claims, 4 Drawing Sheets

(56) References Cited

U.S. PATENT DOCUMENTS

| | | | |
|---|---|---|---|
| 8,017,057 B2 * | 9/2011 | Edwards | B29C 43/006 |
| | | | 264/109 |
| 8,365,696 B2 * | 2/2013 | Ishida | F16J 9/14 |
| | | | 277/491 |
| 2007/0176371 A1 | 8/2007 | Yamada | |
| 2012/0112415 A1 * | 5/2012 | Benjamin | F16J 15/3272 |
| | | | 277/303 |

FOREIGN PATENT DOCUMENTS

| | | | | |
|---|---|---|---|---|
| GB | 2151721 A | * | 7/1985 | F16J 15/3456 |
| GB | 2151721 A | | 7/1985 | |
| JP | 601469 B2 | | 1/1985 | |

* cited by examiner

SCRAPER RING FOR A PISTON

TECHNICAL FIELD

The present disclosure relates generally to a piston ring and, for example, to a scraper ring for a piston.

BACKGROUND

A power system (e.g., a 4-stroke engine) powers a machine by converting chemical energy stored in fuel (e.g., diesel fuel, gasoline, and/or the like) into mechanical work. Depending upon the type of power system, an air-fuel mixture is either formed in a combustion chamber of a cylinder or introduced into the combustion chamber of the cylinder. A piston is mounted within the cylinder to slide along a lubricated surface in a cycle between a top dead center (TDC) position and a bottom dead center (BDC) position. As the piston moves toward the TDC position, the piston compresses the air-fuel mixture within the combustion chamber, and the fuel is ignited. A force of the explosion drives the piston down towards the BDC position, and the cycle repeats. Because the piston is connected to a drivetrain of the machine, continued movement of the piston propels and/or powers the machine.

In order to substantially seal the combustion chamber (e.g., to substantially limit the air-fuel mixture from leaking out of the combustion chamber and/or to substantially limit oil on the lubricated surface from entering the combustion chamber), the piston includes expandable rings mounted to an outer surface thereof. However, because the expandable rings have end gaps, the expandable rings may permit a bead of the oil to flow directly into the combustion chamber. As a result, the power system may experience performance issues, such as increased oil consumption, surface deposits, emissions, and/or unintentional ignition of the charge.

U.S. Publication No. 2012/0112415, which published on May 10, 2012, discloses a rotating seal ring (or piston ring). The seal ring is split to define a first free end (or arm) and a second free end (or arm) that can contact overlap one another, and which can move relative to another in a circumferential direction along a split surface located at an interface between mating cut-out notch surfaces of the first and second free ends.

The scraper ring of the present disclosure solves one or more of the problems set forth above and/or other problems in the art.

SUMMARY

In some implementations, a scraper ring for a piston includes an arcuate body comprising an inner surface, an outer surface, a first end surface connecting the inner surface to the outer surface, and a second end surface that is opposite to the first end surface, a first projection extending circumferentially from the first end surface, wherein the first projection comprises a first inner surface, a first outer surface, and a first contact surface connecting the first inner surface to the first outer surface; and a second projection extending circumferentially from the second end surface, wherein the second projection comprises a second inner surface, a second outer surface, and a second contact surface connecting the second inner surface to the second outer surface; wherein the first contact surface is configured to slidably contact the second contact surface to adjust a diameter of the scraper ring; and wherein, when the first contact surface contacts the second contact surface, the inner surface, the first inner surface, and the second inner surface together define an interior surface of the scraper ring that extends 360 degrees relative to a central axis of the scraper ring, and the outer surface, the first outer surface, and the second outer surface together define an exterior surface of the scraper ring that extends 360 degrees relative to the central axis; and wherein at least one of the first projection or the second end surface includes a groove to permit fluid to pass from the interior surface of the scraper ring to the exterior surface of the scraper ring.

In some implementations, a scraper ring for a piston includes a top surface having a first planar portion and a first angled portion; a bottom surface having a second planar portion and a second angled portion, wherein the second angled portion is configured to slidably contact the first angled portion to adjust a diameter of the scraper ring; an inner surface connecting the top surface to the bottom surface; and an outer surface that is opposite to the top surface, wherein the outer surface is configured to form 360 degrees of contact with a wall of a cylinder to substantially limit an amount of oil entering a combustion chamber of the cylinder.

In some implementations, a scraper ring includes an outer surface that is configured to form 360 degrees of contact with a wall of a cylinder in order to substantially limit oil from passing between the scraper ring and the wall to enter a combustion chamber of the cylinder; and a bottom surface that is configured to form less than 360 degrees of contact with a land of a piston to permit gas to vent between the scraper ring and the land.

DETAILED DESCRIPTION

This disclosure relates to a ring, which is applicable to any system that includes a movable junction between two chambers of fluid. For example, the system may be a power system, and the movable junction may be a piston that separates a combustion chamber of a cylinder from an interior of a crankcase. The combustion chamber may contain an air-fuel mixture, while the interior of the crankcase may contain oil. The power system may be implemented in a vehicle (e.g., a motor vehicle, a railed vehicle, a watercraft, an aircraft), a generator, or another machine.

To simplify the explanation below, the same reference numbers may be used to denote like features. The drawings may not be to scale.

Figure 1:
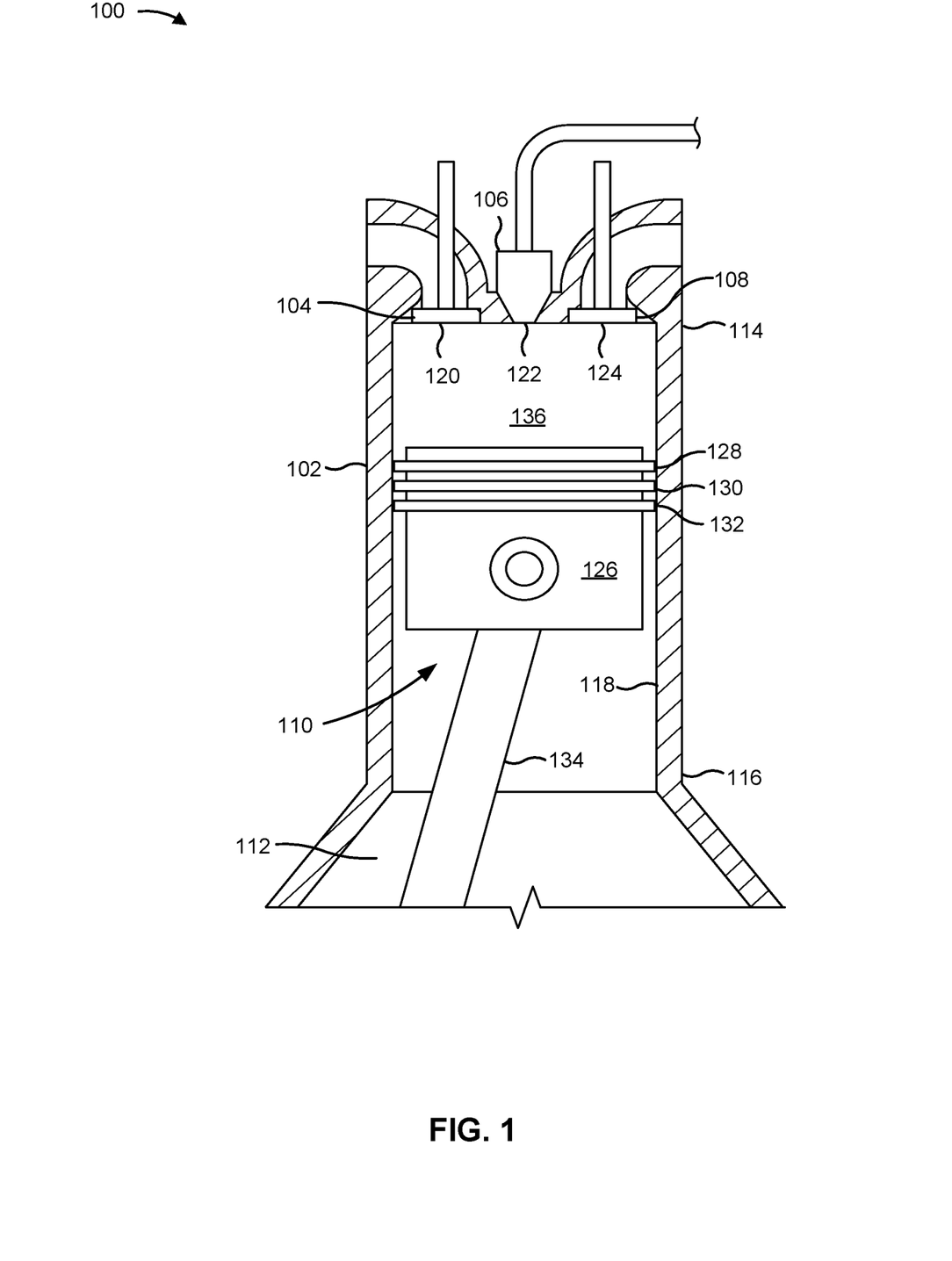
FIG. 1 is an interior view of an exemplary power system including a plurality of rings.
Figure 2:
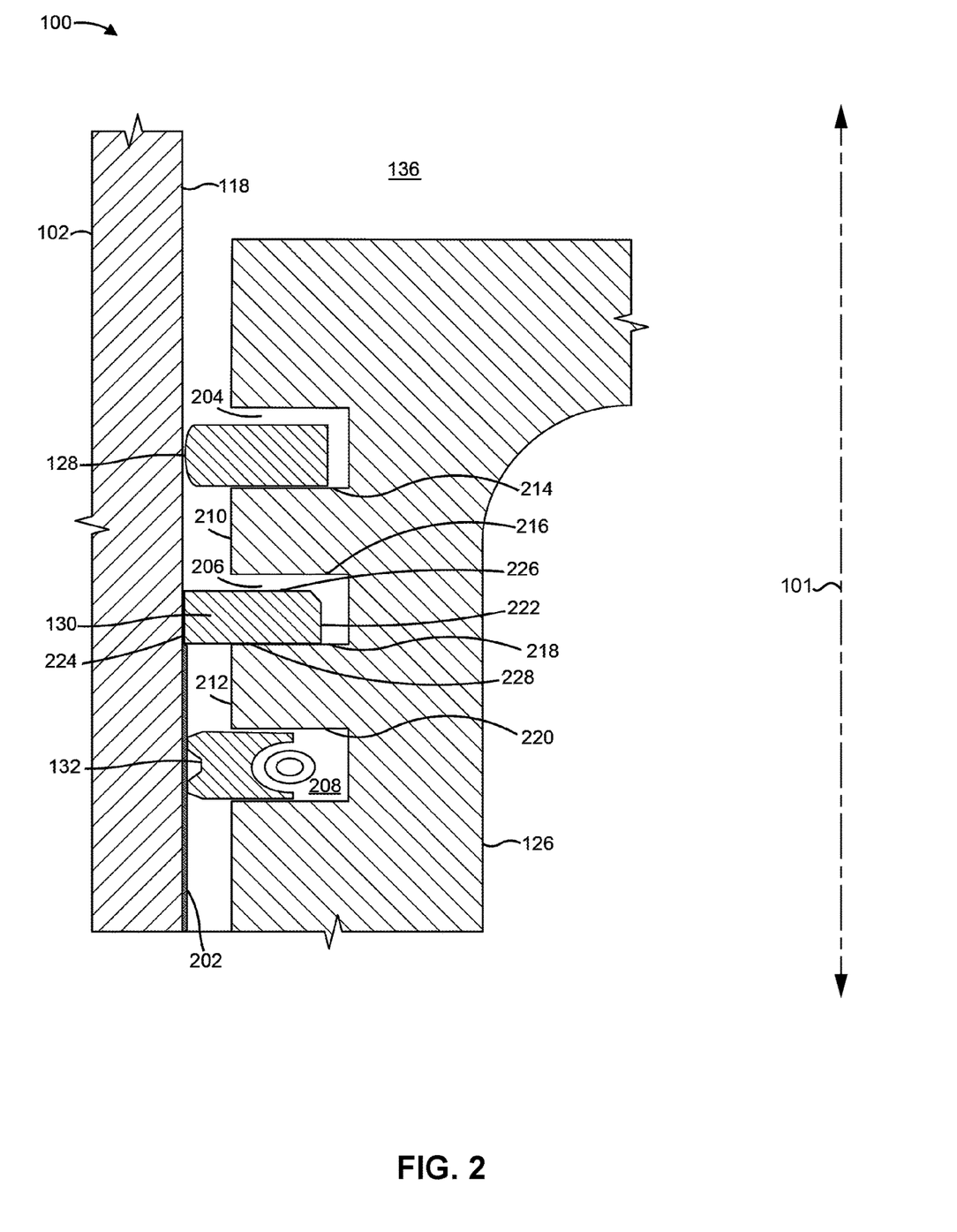
FIG. 2 is a cross-sectional view of the power system.

FIGS. 1-2 depict an exemplary power system 100. As shown in FIG. 1, the power system 100 includes a cylinder 102, an intake valve 104, a fuel injector 106, an exhaust valve 108, a piston assembly 110, and a crankcase 112. The cylinder 102 includes an upper end 114, a lower end 116, and a wall 118 extending between the upper end 114 and the lower end 116. The upper end 114 of the cylinder 102 includes an air inlet 120, a fuel inlet 122, and an exhaust outlet 124. The intake valve 104 is movably seated in the air inlet 120 to allow air to pass therethrough into the cylinder 102. The fuel injector 106 is mounted to the fuel inlet 122 to allow fuel to pass therethrough into the cylinder 102 to mix with the air to form an air-fuel mixture. The exhaust valve 108 is movably seated in the exhaust outlet 124 to allow exhaust gas to pass therethrough to exit the cylinder 102. The lower end 116 of the cylinder 102 is connected to the crankcase 112.

The piston assembly 110 includes a piston 126, a compression ring 128, a scraper ring 130, an oil control ring 132, and a connecting rod 134. The piston 126, which defines a lower end of a combustion chamber 136, is slidably mounted within the cylinder 102 to travel in a 4-stroke cycle (including an intake stroke, a compression stroke, a combustion stroke, and an exhaust stroke) to convert chemical energy stored in the fuel into mechanical work. As shown in FIG. 2, to minimize friction between the piston 126 and the wall 118, the wall 118 may include a film of oil 202. The piston 126 includes a first annular groove 204, a second annular groove 206, and a third annular groove 208. A first land 210 separates the first annular groove 204 from the second annular groove 206, and a second land 212 separates the second annular groove 206 from the third annular groove 208. In other words, the first land 210 includes a first upper surface 214, which defines a floor of the first annular groove 204, and a first lower surface 216, which defines a ceiling of the second annular groove 206. The second land 212, in turn, includes a second upper surface 218, which defines a floor of the second annular groove 206, and a second lower surface 220, which defines a ceiling of the third annular groove 208.

The compression ring 128 is structured and arranged within the first annular groove 204 to substantially limit the air-fuel mixture from exiting the combustion chamber 136 between the piston 126 and the wall 118. The scraper ring 130, which will be described below in connection with FIGS. 3-6, is structured and arranged within the second annular groove 206 to further seal the combustion chamber 136 and to substantially limit an amount of oil from the film of oil 202 entering the combustion chamber 136. The scraper ring 130 defines a central axis 101 and includes an interior surface 222, an exterior surface 224 that is opposite to the interior surface 222, an uppermost surface 226 that connects the interior surface 222 to the exterior surface 224, and a lowermost surface 228 that is opposite to the uppermost surface 226. In use, the exterior surface 224 of the scraper ring 130 contacts the wall 118, and the lowermost surface 228 of the scraper ring 130 contacts the second upper surface 218 of the second land 212. The oil control ring 132 is structured and arranged within the third annular groove 208 to further limit the oil from entering the combustion chamber 136. The connecting rod 134 is configured to connect the piston 126 to one or more components within the crankcase 112 (e.g., a crankpin, a crank, and/or a crankshaft) to drive a drivetrain.

As indicated above, FIGS. 1-2 are provided as an example. Other examples may differ from what is described with regard to FIGS. 1-2. For example, the number and arrangement of components (e.g., the cylinder 102, the intake valve 104, the fuel injector 106, the exhaust valve 108, the crankcase 112, the piston 126, the compression ring 128, the scraper ring 130, and/or the oil control ring 132) may differ from that shown in FIGS. 1-2. Thus, there may be additional components, fewer components, different components, differently shaped components, and/or differently arranged components than those shown in FIGS. 1-2. Furthermore, as indicated above, it should be understood that the power system 100, though shown and described above as a diesel engine, may alternatively be a gasoline engine or another type of system. The power system 100 may include a plurality of the cylinders 102 arranged in an in-line configuration, a "V" configuration, or another suitable configuration.

FIGS. 3-6 depict the scraper ring 130. In the description to follow, a first end 302 and a second end 402 of the scraper ring 130 will be described. However, it should be understood that the first end 302 and the second end 402 are connected by a single, arcuate piece of material, which is referred to below as the arcuate body 304.

As shown in FIGS. 3-6, the scraper ring 130 is a split ring that includes the arcuate body 304, a first projection 306, and a second projection 404. The arcuate body 304 includes an inner surface 308, an outer surface 310, a top surface 312, a bottom surface 314, a first end surface 316, and a second end surface 406. The inner surface 308 includes a chamfer 318, which facilitates sealing the scraper ring 130 against the second upper surface 218 of the second land 212 (e.g., due to a downward force of fluid trapped between the compression ring 128 and the scraper ring 130). The outer surface 310, which is substantially cylindrical and opposite to the inner surface 308, is configured to contact the wall 118 of the cylinder 102. The top surface 312, which defines the uppermost surface 226 of the scraper ring 130, is substantially planar and connects the inner surface 308 to the outer surface 310. The bottom surface 314, which defines the lowermost surface 228 of the scraper ring 130 and is also substantially planar, is opposite to the top surface 312. The bottom surface 314 is configured to contact the second upper surface 218 of the second land 212 to substantially limit an amount of oil or other fluid from bypassing the scraper ring 130.

Figure 3:
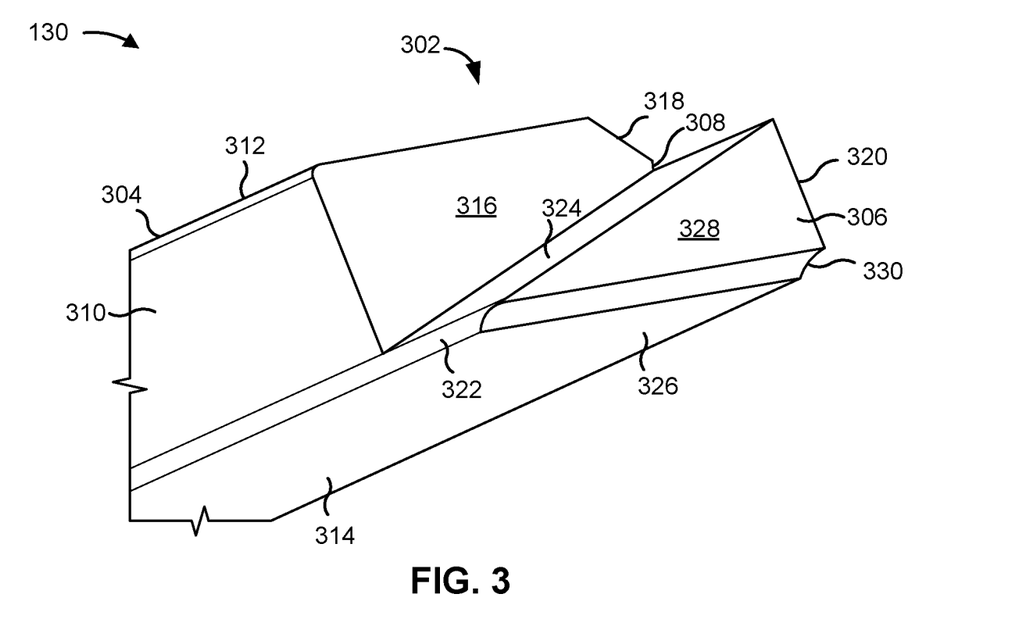
FIG. 3 is an isometric view of a first end of a scraper ring of the plurality of rings.

The first projection 306 extends circumferentially from the first end surface 316 and has a substantially triangular prismatic shape. The first projection 306 includes a first inner surface 320, a first outer surface 322, a first contact surface 324, a first bottom surface 326, a first lateral surface 328, and a first groove 330. The first inner surface 320 of the first projection 306 abuts and extends from the inner surface 308 of the arcuate body 304. The first outer surface 322, which is opposite to the first inner surface 320, abuts and extends from the outer surface 310 of the arcuate body 304. The first contact surface 324 connects the first inner surface 320 to the first outer surface 322 and extends at a first angle relative to the first bottom surface 326. For example, the first angle may be in a range of approximately 5 to approximately 65 degrees. As a further example, the first angle may be in a range of approximately 10 degrees to approximately 30 degrees. The first bottom surface 326, which is opposite to the first contact surface 324, abuts and extends from the bottom surface 314 of the arcuate body 304. The first lateral surface 328 is substantially parallel to the first end surface 316. The first groove 330, which has a curved cross-sectional shape, extends radially from the first inner surface 320 to the first outer surface 322 between the first lateral surface 328 and the first bottom surface 326.

Figure 4:
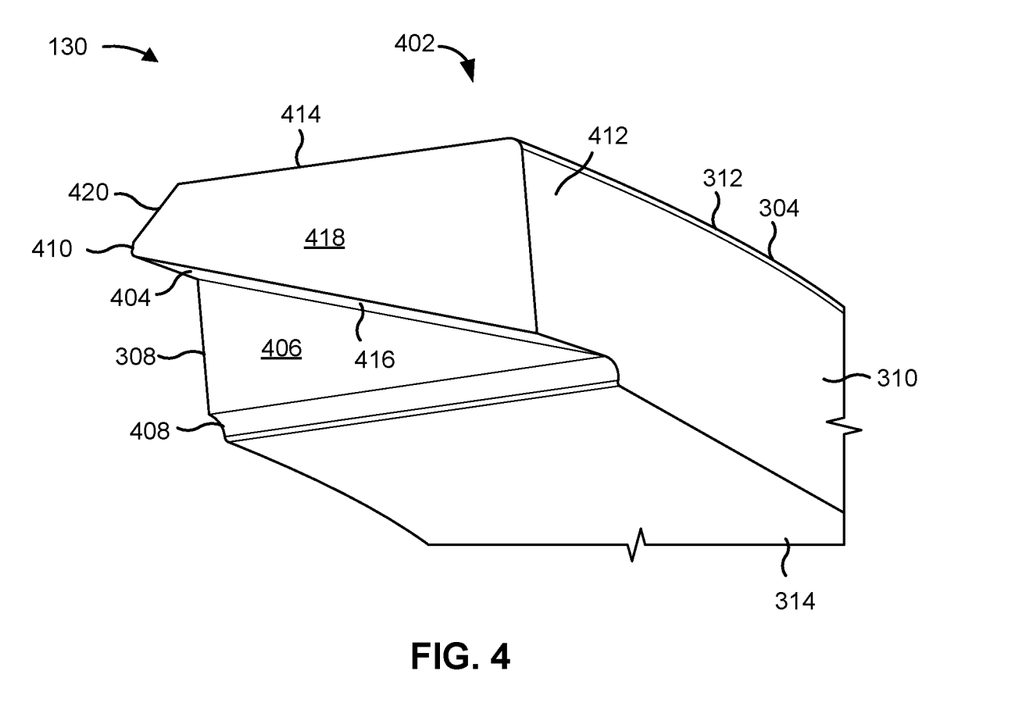
FIG. 4 is an isometric view of a second end of the scraper ring.

The second projection 404 extends circumferentially from the second end surface 406, which includes a second groove 408 that extends radially from the inner surface 308 to the outer surface 310 of the arcuate body 304 along the bottom surface 314. The second projection 404 includes a second inner surface 410, a second outer surface 412, a second top surface 414, a second contact surface 416, and a second lateral surface 418. The second inner surface 410, which includes a second chamfer 420, abuts and extends from the inner surface 308 of the arcuate body 304. The second outer surface 412, which is opposite to the second inner surface 410, abuts and extends from the outer surface 310 of the arcuate body 304. The second top surface 414 abuts and extends from the top surface 312. The second contact surface 416, which is opposite to the second top surface 414, connects the second inner surface 410 to the second outer surface 412. In order to form a seal with the first contact surface 324, the second contact surface 416 extends at a second angle relative to the second top surface 414 that is substantially equal to the first angle. For example, the second angle may be in a range of approximately 5 to approximately 65 degrees. As a further example, the second angle may be in a range of approximately 10 degrees to approximately 30 degrees. Thus, the second contact surface 416 is configured to slidably contact the first contact surface 324 to place the scraper ring in the overlapped state. The second lateral surface 418 is substantially parallel to the first end surface 316.

Figure 5:
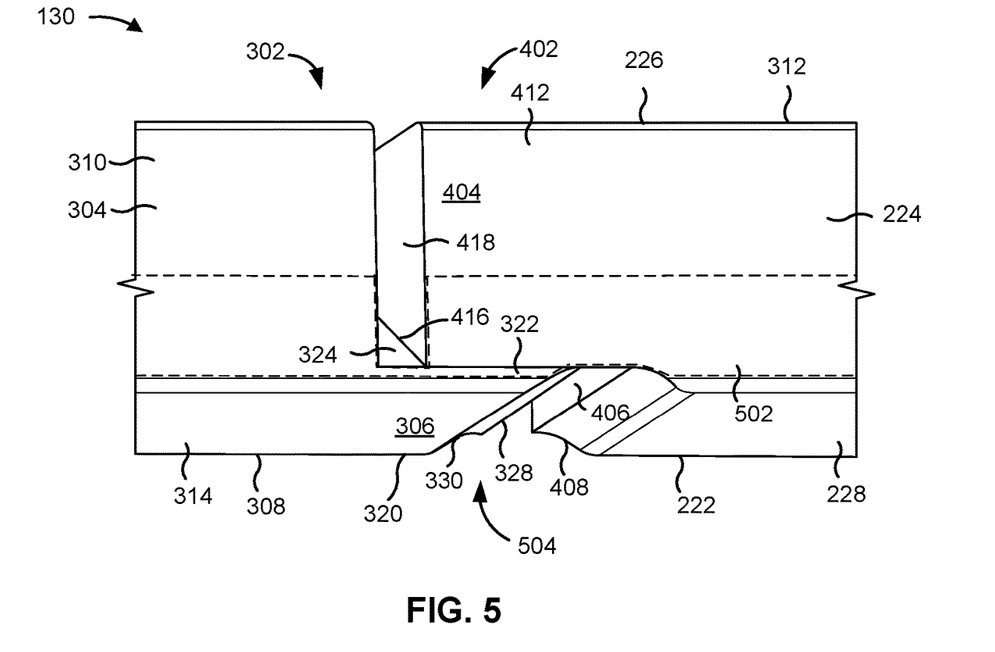
FIG. 5 is a bottom isometric view of the first end and the second end of the scraper ring in an overlapped state.
Figure 6:
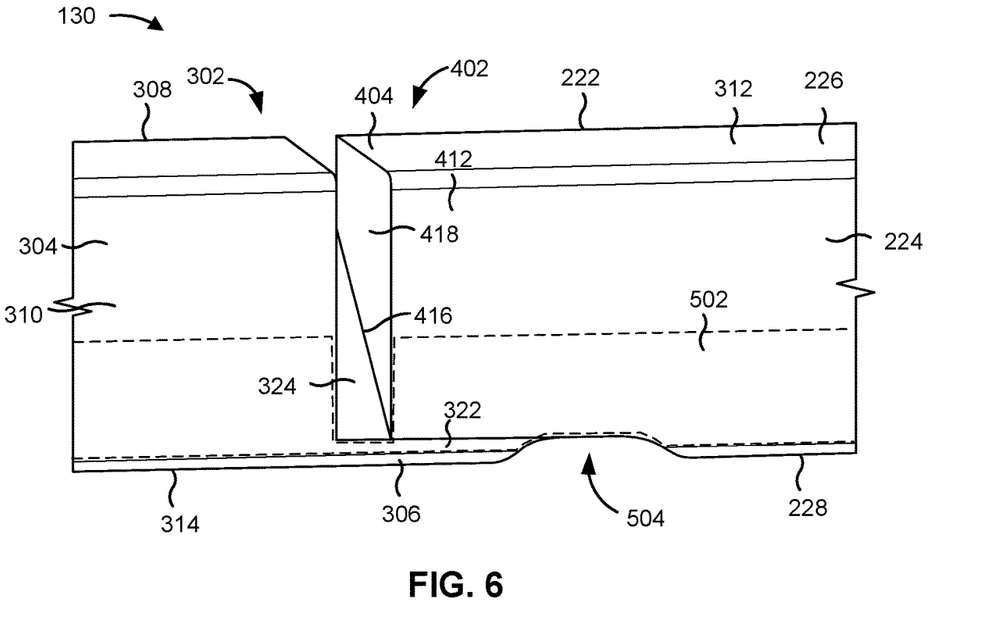
FIG. 6 is a top isometric view of the first end and the second end of the scraper ring in the overlapped state.

When the scraper ring 130 is in the overlapped state (as shown in FIGS. 5-6), the inner surface 308 of the arcuate body 304, the first inner surface 320 of the first projection 306, and the second inner surface 410 of the second projection 404 together define the interior surface 222, which extends 360 degrees about a central axis of the scraper ring 130. Likewise, the outer surface 310 of the arcuate body 304, the first outer surface 322 of the first projection 306, and the second outer surface 412 of the second projection 404 together define the exterior surface 224, which extends 360 degrees about the central axis of the scraper ring 130. In other words, when the scraper ring 130 is positioned within the second annular groove 206 of the piston 126, the exterior surface 224 of the scraper ring 130 is configured to form 360 degrees of contact with the wall 118 of the cylinder 102. Thus, the exterior surface 224 substantially limits an amount of oil that may travel along the wall 118 from the film of oil 202 into the combustion chamber 136. Over time, and due to the contact with the wall 118, a lower portion 502 of the exterior surface 224 (as shown by the dotted line) is configured to abrade away while maintaining the 360 degrees of contact with the wall 118. The first groove 330, the first lateral surface 328, the second groove 408, and the second end surface 406 together form a passage 504 for fluid (e.g., air, fuel, and/or oil) to flow from the interior surface 222 to the exterior surface 224 of the scraper ring 130. By including the first groove 330 and/or the second groove 408 in the scraper ring 130, the scraper ring 130 is configured to vent the fluid regardless of the degree of overlap between the first end 302 and the second end 402 of the scraper ring 130. For example, even if the first lateral surface 328 and the second end surface 406 abut, the fluid may flow through the first groove 330 and/or the second groove 408 to relieve pressure between the compression ring 128 and the scraper ring 130.

The scraper ring 130 is formed of a single, integral piece of material, such as stainless steel. In order to fit within the second annular groove 206 of the piston 126, the interior surface 222 of the scraper ring 130 may have a diameter in a range of approximately 50 millimeters (mm) to approximately 600 mm. As an example, the diameter of the interior surface 222 may be in a range of approximately 150 mm to approximately 175 mm. The uppermost surface 226 and/or the lowermost surface 228 of the scraper ring 130 may have a width, in a radial direction, that is greater than a distance between an exterior of the second land 212 and the wall 118. For example, the width may be in a range of approximately 2 mm to approximately 25 mm. As a further example, the width may be in a range of approximately 6 mm to approximately 7 mm. In order to allow fluid (e.g., the air-fuel mixture) to enter the second annular groove 206 to press the scraper ring 130 against the wall 118 and the second upper surface 218 of the second land 212, the interior surface 222 and/or the exterior surface 224 may have a height, in an axial direction, that is less than a height of the second annular groove 206. For example, the height may be in a range of approximately 1 mm to approximately 15 mm. As a further example, the height may be in a range of approximately 3 millimeters to approximately 4 millimeters. Other materials and/or dimensions are contemplated.

As indicated above, FIGS. 3-6 are provided as an example. Other examples may differ from what is described with regard to FIGS. 3-6. For example, the number and arrangement of surfaces may differ from that shown in FIGS. 1-2. Thus, there may be additional surfaces, fewer surfaces, and/or differently shaped surfaces than those shown in FIGS. 3-6. For example, the first contact surface 324 and the second contact surface 416 may have curved shapes, a stepped shapes, serrated shapes, or another shape that allows the first contact surface 324 and the second contact surface 416 to slide relative to another while forming a seal. As another example, the scraper ring 130 may include only one of the first groove 330 or the second groove 408, the first groove 330 and the second grooves 408 may be have different shapes (e.g., a chamfered cross-section, a triangular cross-section, non-linear sides, and/or the like), may be provided at different and/or additional portions of the scraper ring 130, and/or may be provided, either additionally or alternatively, within the second upper surface 218 of the second land 212. For example, in some implementations, the second upper surface 218 may include one or more radially-extending grooves having substantially the same structure and venting functionality as the first groove 330 and the second groove 408. As a further example, the exterior surface 224 of the scraper ring 130 may be angled relative to the bottom surface 314 (e.g., at an 80 degree angle, at a 60 degree angle, and/or the like). In such an example, the lower portion 502 of the exterior surface 224 may continue to be configured to abrade away while maintaining the 360 degrees of contact with the wall 118.

INDUSTRIAL APPLICABILITY

The scraper ring 130 of the present disclosure is particularly applicable to in a system that includes a movable junction between two chambers of fluid, such as the power system 100. The power system 100 may be implemented in a vehicle (e.g., a motor vehicle, a railed vehicle, a watercraft, an aircraft), a generator, or another machine.

Due to the structure and arrangement of the scraper ring 130 relative to the piston 126, the scraper ring has a number of benefits. For example, because the first end 302 and the second end 402 of the scraper ring 130 are configured to slidably overlap, the exterior surface 504 forms 360 degrees of contact with the wall 118 of the cylinder 102. As a result, the scraper ring 130 substantially limits an amount of oil that may pass from the film of oil 202 directly into the combustion chamber 136. Because of this, the scraper ring 130, relative to a typical split ring, improves performance of the power system 100 by decreasing oil consumption, surface deposits, emissions, and/or a possibility of unintentional ignition of the charge. Furthermore, by including the first groove 330 and/or the second groove 408, the scraper ring 130 provides a vent for any fluid (e.g., air, fuel, and/or oil)

that may be trapped between the compression ring 128 and the scraper ring 130. Such a vent is beneficial because without it, the pressure between the compression ring 128 and the scraper ring 130 may at times be greater than the pressure in the combustion chamber 136, which may result in the fluid entering the combustion chamber 136.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A scraper ring for a piston, comprising:
   an arcuate body defining a central axis and comprising an inner surface, an outer surface, a first end surface connecting the inner surface to the outer surface, a second end surface that is opposite to the first end surface, a top surface, and a bottom surface,
   a first projection extending circumferentially from the first end surface, wherein the first projection comprises a first inner surface, a first outer surface, and a first contact surface connecting the first inner surface to the first outer surface and oriented at a first angle to the top surface opening in a first radial direction; and
   a second projection extending circumferentially from the second end surface,
   wherein the second projection comprises a second inner surface, a second outer surface, and a second contact surface connecting the second inner surface to the second outer surface and oriented at a second angle to the bottom surface opening in a second radial direction;
   wherein the first contact surface is configured to slidably contact the second contact surface to adjust a diameter of the scraper ring; and
   wherein, when the first contact surface contacts the second contact surface,
   the inner surface, the first inner surface, and the second inner surface together define an interior surface of the scraper ring that extends 360 degrees relative to a central axis of the scraper ring, and
   the outer surface, the first outer surface, and the second outer surface together define an exterior surface of the scraper ring that extends 360 degrees relative to the central axis; and
   a passage to permit fluid to pass through the scraper ring,
   the passage being formed by a first groove in the first projection extending through the scraper ring in a radial direction and upwardly from the bottom surface in an axial direction, a second groove in the second end surface and shaped as a mirror image of the first groove, and a clearance located between the first groove and the second groove in a circumferential direction.

2. The scraper ring of claim 1, wherein
   the arcuate body further includes:
   a bottom surface connecting the inner surface to the outer surface, and
   a top surface that is opposite to the bottom surface;
   the first projection further includes a first bottom surface that is substantially co-planar with the bottom surface; and
   the second projection further includes a second top surface that is substantially co-planar with the top surface.

3. The scraper ring of claim 2, wherein
   the first contact surface extends at an angle relative to the first bottom surface; and
   the second contact surface extends at the angle relative to the second top surface.

4. The scraper ring of claim 3, wherein the angle is in a range of approximately 10 degrees to approximately 30 degrees.

5. The scraper ring of claim 1, wherein
   the inner surface of the arcuate body includes a first chamfer; and
   the second inner surface of the second projection includes a second chamfer that is substantially co-planar with the first chamfer.

6. The scraper ring of claim 1, wherein the inner surface includes a chamfer extending from the first end to the second end of the scraper ring.

7. The scraper ring of claim 1, wherein the passage defines venting of gas from the combustion chamber to pass radially from the inner surface of the scraper ring to the outer surface of the scraper ring.

8. The scraper ring of claim 1, wherein a lower portion of the outer surface is configured to abrade away while maintaining the 360 degrees of contact with the wall of the cylinder.

9. The scraper ring of claim 1, wherein the inner surface of the scraper ring defines the diameter; and when the first contact surface contacts the second contact surface, the diameter of the scraper ring is in a range of approximately 150 millimeters to approximately 175 millimeters.

10. The scraper ring of claim 1, wherein the scraper ring is made of stainless steel.

11. The scraper ring of claim 1, wherein the scraper ring has a height in a range of approximately 3 millimeters to approximately 4 millimeters.

12. The scraper ring of claim 1, wherein the scraper ring has a width in a range of approximately 6 millimeters to approximately 7 millimeters.

\* \* \* \* \*